(12) United States Patent
High et al.

(10) Patent No.: US 11,741,395 B2
(45) Date of Patent: Aug. 29, 2023

(54) SYSTEMS AND METHODS FOR OBJECT MATCHING AND SUBSTITUTION

(71) Applicant: Walmart Apollo, LLC, Bentonville, AR (US)

(72) Inventors: Donald High, Noel, MO (US); Anton Valkov, San Francisco, CA (US); ChandraShekar Natarajan, Valencia, CA (US); Mario Alberto Cornejo Barriere, Cupertino, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/850,302

(22) Filed: Jun. 27, 2022

(65) Prior Publication Data

US 2022/0327427 A1 Oct. 13, 2022

Related U.S. Application Data

(63) Continuation of application No. 16/085,771, filed as application No. PCT/US2017/022907 on Mar. 17, 2017, now Pat. No. 11,373,118.

(Continued)

(51) Int. Cl.
*G06N 20/00* (2019.01)
*G06F 16/955* (2019.01)
(Continued)

(52) U.S. Cl.
CPC ........... *G06N 20/00* (2019.01); *G06F 16/955* (2019.01); *G06F 16/9537* (2019.01);
(Continued)

(58) Field of Classification Search
CPC ... G06N 20/00; G06F 16/9537; G06F 16/955; G06Q 10/087; G06Q 30/0631; G06Q 30/0633
See application file for complete search history.

(56) References Cited

U.S. PATENT DOCUMENTS

| 5,878,401 A | 3/1999 | Joseph |
| 7,685,024 B2 | 3/2010 | Ofer |

(Continued)

FOREIGN PATENT DOCUMENTS

| WO | 2015192106 | 12/2015 |
| WO | 2017161237 | 9/2017 |

OTHER PUBLICATIONS

PCT; App. No. PCT/US2017-022907; International Preliminary Report on Patentability dated Sep. 18, 2018.

(Continued)

*Primary Examiner* — Roberto Borja
(74) *Attorney, Agent, or Firm* — Fitch, Even, Tabin & Flannery LLP

(57) ABSTRACT

Described in detail herein are systems and methods for network environment for a dynamic learning system for object matching and substitution using hand-held electronic devices. In exemplary embodiments, a hand-held electronic device may receive a request for physical objects of which a first physical object may be unavailable. The hand-held electronic device may transmit an identifier of the first physical object to a central computing system. The central computing system may query the database to retrieve data associated with the first physical object. The centrally computing system may attempt to match the first physical object to an available physical object based on dynamically learned matching behavior using the retrieved data. In response to matching data associated with one of the available physical objects to the data associated with the first physical object the central computing system may learn to replace the first physical object on the list with the one of the available physical objects based on dynamically learned matching behavior.

15 Claims, 6 Drawing Sheets

Related U.S. Application Data

(60) Provisional application No. 62/309,678, filed on Mar. 17, 2016.

(51) Int. Cl.
*G06F 16/9537* (2019.01)
*G06Q 30/0601* (2023.01)
*G06Q 10/087* (2023.01)

(52) U.S. Cl.
CPC ....... *G06Q 10/087* (2013.01); *G06Q 30/0631* (2013.01); *G06Q 30/0633* (2013.01)

(56) References Cited

U.S. PATENT DOCUMENTS

| | | | | |
|---|---|---|---|---|
| 8,090,626 | B1* | 1/2012 | Wijaya | G06Q 10/087 |
| | | | | 705/26.81 |
| 11,373,118 | B2 | 6/2022 | High | |
| 2003/0046173 | A1 | 3/2003 | Benjier | |
| 2004/0117276 | A1 | 6/2004 | Kettler | |
| 2006/0247973 | A1* | 11/2006 | Mueller | G06Q 20/20 |
| | | | | 705/26.1 |
| 2007/0073591 | A1 | 3/2007 | Perry | |
| 2008/0270249 | A1 | 10/2008 | Rosenbaum | |
| 2011/0055046 | A1 | 3/2011 | Bowen | |
| 2011/0082765 | A1 | 4/2011 | Mazor | |
| 2014/0032362 | A1 | 1/2014 | Frayman | |
| 2014/0089129 | A1 | 3/2014 | Argue | |
| 2014/0136549 | A1 | 5/2014 | Surya et al. | |
| 2014/0180785 | A1* | 6/2014 | Argue | G06Q 30/0223 |
| | | | | 705/14.24 |
| 2014/0180865 | A1 | 6/2014 | Argue | |
| 2015/0112843 | A1 | 4/2015 | Pinel | |
| 2015/0120759 | A1* | 4/2015 | Kang | G06F 16/24578 |
| | | | | 707/748 |
| 2015/0142620 | A1* | 5/2015 | Dudziak | G06Q 10/087 |
| | | | | 705/28 |
| 2015/0317708 | A1 | 11/2015 | Eramian | |
| 2016/0210682 | A1 | 7/2016 | Kannan | |

OTHER PUBLICATIONS

PCT; App. No. PCT/US2017/022907; International Search Report and Written Opinion dated Sep. 21, 2017.

U.S. Appl. No. 16/085,771; Final Rejection dated Oct. 29, 2021; (pp. 1-47).

U.S. Appl. No. 16/085,771; Non-Final Rejection dated May 28, 2021; (pp. 1-30).

U.S. Appl. No. 16/085,771; Notice of Allowance and Fees Due (PTOL-85) dated Feb. 22, 2022; (pp. 1-15).

* cited by examiner

SYSTEMS AND METHODS FOR OBJECT MATCHING AND SUBSTITUTION

CROSS-REFERENCE TO RELATED PATENT APPLICATIONS

This application is a continuation of U.S. application Ser. No. 16/085,771 filed Sep. 17, 2018, which is a 35 U.S.C. § 371 National Stage filing of International Application No. PCT/US2017/022907 filed Mar. 17, 2017, which claims priority to U.S. Provisional Application No. 62/309,678 filed on Mar. 17, 2016, each of which is hereby incorporated by reference in its entirety.

BACKGROUND

Identifying objects that represent substitutable substitutes for other objects can be challenging. This problem can be compounded by the quantity of possible objects available for substitution and the different and varied behaviors and/or characteristics associated with the requesters of the objects.

BRIEF DESCRIPTION OF DRAWINGS

Illustrative embodiments are shown by way of example in the accompanying drawings and should not be considered as a limitation of the present disclosure.

DETAILED DESCRIPTION

Figure 1:
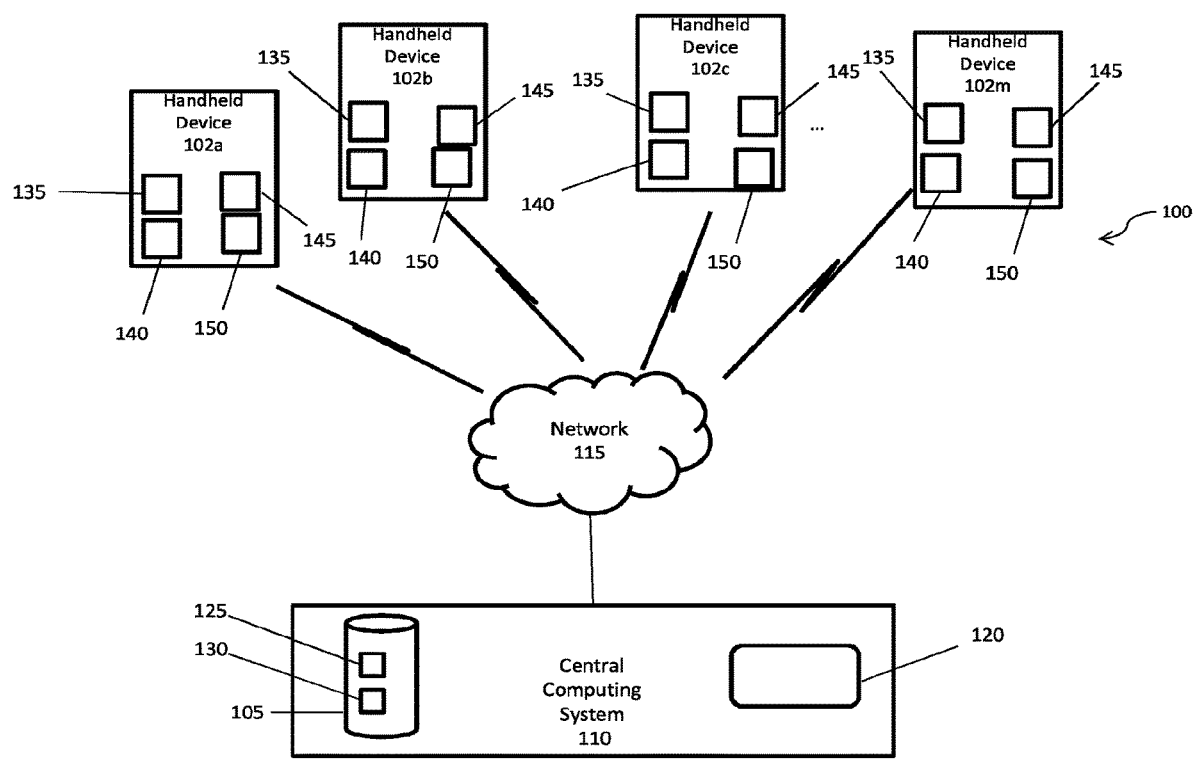
FIG. 1 illustrates an exemplary network environment for a system for object matching and substitution in accordance with exemplary embodiments of the present disclosure.

Described in detail herein are systems and methods for systems and methods for object matching and substitution. In exemplary embodiments, hand-held electronic devices can receive requests for physical objects. Each of the hand-held electronic devices can include a processor, memory, a display, and a radiofrequency (RF) transceiver. The hand-held devices can be communicatively coupled with the central computing system. As a non-limiting example, the hand-held electronic devices can be programmed to receive lists of physical objects in the requests via the RF transceiver.

In response to determining that a first physical object identified in one of the requests is unavailable, the hand-held electronic device handling the request can identify a substitute physical object based on information included in the request and/or can transmit, via the RF transceiver, an identifier associated with the first physical object to a central computing system to request that the central computing system identify a substitute physical object based on dynamically learned behavior. When identifying an available substitute product, the handheld device and/or the central computing system can consider the availability of the substitute product at a geographic location associated with the request and/or at other geographic locations (e.g., other geographic locations that are within a specified distance of the geographic location associated with the request.

In response to a request to identify a substitute object being received by the central computing system, the central computing system can query a database to retrieve data associated with the first unavailable physical object. The centrally computing system can attempt to match the first unavailable physical object to an available substitute physical object based on dynamically learned matching behavior and the retrieved data associated with the first unavailable physical object. In response to matching data associated with one of the available physical objects to the data associated with the first unavailable physical object, the central computing system can learn to replace the first physical object on the list with the one of the available physical objects based on dynamically learned matching behavior.

In accordance with embodiments of the present disclosure, the central computing system can generate dynamically learned matching behavior based on a collective response to past object substitutions and/or similarities between the data associated with the first physical object and the data associated with the available physical objects. The similarities between the data associated with the first physical object and the data associated with the available physical objects include a similar name, type, size, and weight.

In exemplary embodiments, in response to an inability to match the first unavailable physical object with the available substitute physical objects in a first facility, the central computing system is further programmed to determine if the first physical object is present in a second facility based on proximity. In response to determining the first physical object exists in the second facility, the central computing system requests transportation of the first physical object from the second facility to the first facility. In some embodiments, the central computing system can use GPS location information of the at least one of the hand-held devices that transmitted the request to the central computing system to locate the second facility.

FIG. 1 depicts a system 100 for object matching and substitution in accordance with exemplary embodiments. In exemplary embodiments, the system 100 includes hand-held electronic devices 102a-m. The handheld devices 102a-m can each include a processor 135, memory 140, a display 145, and an RF transceiver 150, and can each be configured to communicate with a central computing system 110 via a network 115 using the RF transceiver 150. The central computing system can include a server 120 and a database 105. The central computing system 110 can be operatively coupled to the database 105, which can include a physical objects data source 125 and a user data source 130. The physical objects data source can store data associated with physical objects including but not limited to: names, types, sizes, weights, quantities, availabilities, and previously identified similar physical objects. The user data source 130, can store data associated with users including, but not limited to user names, addresses, past requests and account histories.

In an example embodiment, one or more portions of network 115 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The hand-held electronic devices 102a-m and/or the central computing system 110 including the database 105 and the server 120 are connected to the network 115 via wired or wireless connections.

The hand-held electronic devices 102a-m can include, for example, wireless devices, portable devices, wearable computers, cellular or mobile phones, portable digital assistants (PDAs), smart phones, tablets, ultrabooks, netbooks, laptops, multi-processor systems, microprocessor-based or programmable consumer electronics, mini-computers, and the like.

The hand-held electronic devices 102a-m can be disposed in and/or programmed for a given facility at a geographic location. For example, the hand-held electronic device 102c can be programmed to receive a request for a list of physical objects associated with the given facility. The hand-held electronic device 102c can query the physical objects data source 125 at the central computing system 110 to process the request for physical objects. The hand-held electronic device 102c can determine a first physical object of the requested physical objects is unavailable (e.g., a first unavailable physical object). The hand-held electronic device 102c can transmit an identifier associated with the first unavailable physical object to the central computing system 110 via the network 105 using, for example, the RF transceiver. The identifier can be a string of alphanumeric characters.

The central computing system 110 is programmed to receive the identifier associated with the first unavailable physical object. The central computing system 110 can query the physical objects database 125 to retrieve data associated with the first unavailable physical object. For example, the central computing system 110 can retrieve, a name of the first unavailable physical object, a type of the first unavailable physical object, a size of the first unavailable physical object, a weight of the first unavailable physical object, a quantity of the first unavailable physical object, an availability of the first unavailable physical object in other facilities, and previously identified similar physical objects. The central computing system 110 can attempt to match the data associated with a first physical object to data associated with available substitute physical objects based on dynamically learned matching behavior. The dynamically learned behavior of the central computing system 110 can continue to evolve and/or develop over time, e.g., based on responses to selected substitute physical objects, characteristics of the selected substitute physical objects that are deemed acceptable, characteristics of the selected substitute physical objects that are deemed unacceptable, and characteristics of the uses responding to the selected substitute physical objects. The dynamically learned behavior of the central computing system 110 can be developed based on, for example, decision tree learning, association rule learning, inductive logic learning, support vector learning, cluster analysis learning, Bayesian network learning, and/or similarity and metric learning.

The decision tree learning can use a decision tree as a predictive model, which maps observations about decisions regarding an item and the consequences of those decisions associated with the item. The decision tree can use a tree-like graph of decisions and their possible consequences, including chance event outcomes, resource costs, and utility. In some embodiments, the decision tree can be formed based on responses to past substitutions, previously identified similar objects, and/or similarities between the data of the first unavailable physical object and the data of the available substitute physical objects.

The association rule learning provides for discovering relations between variables in large databases. In this embodiment, the central computing system 110 can use association rule learning to discover relationships between the physical objects data source.

The inductive logic programming learning can use logic programming as a uniform representation for input examples, background knowledge, and hypotheses.

The support vector learning can include a set of related supervised learning methods used for classification and regression.

The cluster analysis can provide for assignment of a set of observations into clusters so that observations within the same cluster are similar according to some pre-designated criteria, while observations drawn from different clusters are dissimilar.

The Bayesian network learning can utilize a probabilistic graphical model that represents a set of random variables and their conditional independencies via a directed acyclic graph.

The similarity and metric learning uses given pairs of examples that are considered similar and pairs of less similar objects to formulate a decision regarding substitute objects.

As described herein, the central computing system 110 can dynamically learn from the data generated each time the first unavailable physical object has been unavailable and a particular different available substitute physical object has been substituted for the first available physical object. The central computing system 110 can also take into account similar physical objects based on type, name, size, and weight of physical objects or the similar physical objects stored in the physical objects data source 125 when attempting to match data. The central computing system 110 can generate the dynamically learned matching behavior based on a collective response of a plurality of users to past object substitutions and similarities between the data associated with the first physical object and the data associated with the available physical objects.

The central computing system 110 can query the users data source 130 to retrieve data associated with the user who requested the first physical object. The central computing system 110 can also query the users data source 130 to retrieve data associated with all the users who have requested the first physical object in the past. The users data source 130 can contain user name, address, and account history.

The account history can include past requests of the first physical object. The central computing system 110 can query the physical objects data source 125 for, the name of the physical object, the type, the quantity, the availability of the physical objects in a nearby facility, physical object history and similar physical objects.

The central computing system 110 can combine the data from the physical objects data source 125 and the users data source 130 to determine the best matching data with an available physical object different than the first physical object. In response to the matching data associated with the available physical object to the data associated with the first physical object and/or past responses to substitute physical objects, the central computing system 110 can learn to replace the first physical object with the available physical object based on dynamically learned matching behavior.

The central computing system 110 can be unable to match the first unavailable physical object with an available substitute physical object in a first facility within which the hand-held electronic device 102c is located. In response to the inability to match the first physical object with an available physical objects in a first facility, the central computing system 110 can determine if the first unavailable physical object is present in a second facility at a second geographic location based on proximity and/or whether a substitute physical object is available in the second facility. For example, the central computing system 110 can query the physical objects data source 125 to retrieve the availability of physical objects associated with other facilities. In some embodiments, the central computing system 110 can determine the location of the first facility by using the GPS location information of the hand-held electronic device 102c. The central computing system 110 can determine facilities with availability of the first unavailable physical object within a predetermined distance of the first facility. In response to determining the first physical object exists in a second facility within a predetermined distance of the first facility, the central computing system 110 can request transportation of the first physical object from the second facility to the first facility. The central computing system 110 can automatically dispatch a car or courier service such as Uber, Lyft, Get, to deliver the physical object 110 from the second facility to the first facility.

In an exemplary embodiment, the above mentioned system can be embodied as a retail store delivery system. For example, the facility can be a retail store and the physical objects can be products sold at the retail store. A user can virtually order products from particular retail store for delivery to their homes. An employee at the retail store can receive the order for products on their hand-held electronic device 102c. The hand-held electronic device 102c can query the physical objects data source 125 to locate the products in the store. The hand-held electronic device 102c can determine one of the products in the order is out-of-stock and unavailable at the retail store. The hand-held electronic device 102c can transmit the identifier of the unavailable product to the central computing system 110.

The central computing system 110 can receive the identifier and query the physical objects data source 125 to retrieve data associated with the unavailable product. For example, the central computing system 110 can retrieve, the name, type, size, weight, the quantity, the availability of the unavailable product in other retail stores and similar products. The central computing system 110 can attempt to match data associated with the unavailable product to the data associated with available products based on dynamically learned matching behavior. For example, the central computing system 110 can dynamically learn from the data that each time the unavailable product has been unavailable a different available product has been substituted for the first physical object. The central computing system 110 can also take into account similar products based on type, name, size, and weight of products or the similar products stored in the physical objects data source 125 when attempting to match data. For example, the user can order a 24 pack of Coca-Cola® which can be unavailable at the retail store, the central computing system 110 can able to learn based on the retrieved data from the physical objects data source 125 that two 12 packs of Pepsi® can be substituted in place of the order of 24 pack of Coca-Cola® based on data associated with each product, past responses of the user to substitutes of two 12 packs of Pepsi® for a 24 pack of Coca-Cola®, and/or a collective response of users to substitutions for a soda.

As described herein, the central computing system 110 can generate the dynamically learned matching behavior based on a collective response of a plurality of users to past product substitutions and similarities between the data associated with the unavailable product and the data associated with the available products. The central computing system 110 can query the physical objects data source 125 and the users data source 130. The central computing system 110 can query the users data source 130 to retrieve data associated with the user who requested the unavailable product. The central computing system 110 can also query the users data source 130 to retrieve data associated with all the users who have requested the unavailable product in the past. The users data source 130 can contain user name, address, and account history. The account history can include past requests of the first physical object. The central computing system 110 can query the physical objects data source 125 for, the name of the unavailable product, the type, the quantity, the availability of the unavailable product in other facilities, unavailable product's history and similar products.

The central computing system 110 can combine the data from the physical objects data source 125 and the users data source 130 to determine the best matching data with available products. In response to the matching data associated with the available products to the data associated with the unavailable product, the central computing system 110 can learn to replace the unavailable product with the best matched available product based on dynamically learned matching behavior. For example, the user can order a 24 pack of Coca-Cola® which can be unavailable at the retail store, the central computing system 110 can be able to learn based on the retrieved data from the physical objects data source 125 that two 12 packs of Pepsi® can be substituted in place of the order of 24 pack of Coca-Cola®. However, based on the data retrieved from the user data source 130, the central computing system 110 can also determine that the user who ordered the 24 pack of Coca-Cola® does not prefer Pepsi® products and users in the past who ordered a 24 pack of Coca-Cola® and do not prefer Pepsi® products chose to substitute the unavailable 24 pack of Coca-Cola® with a 24 pack of Sprite®. Accordingly, the central computing system 110 can replace the 24 pack of Coca-Cola® in the order with a 24 pack of Sprite®.

In another embodiment, the central computing system 110 can be unable to match the unavailable product with an available product in the first retail store in which the hand-held electronic device 102c is located. For example, the user can order a 24 pack of Coca-Cola®. However, based on the data retrieved from the physical object data source 125 and users data source 125 the central computing system 110 can dynamically learn that there are no products that match the unavailable products for the user. In response to the inability to match the unavailable product with an available product in the first retail store, the central computing system 110 can determine if the unavailable product is present in a second retail store based on proximity. For example, the central computing system 110 can query the physical objects data source 125 to retrieve the availability of unavailable products in other retail stores. The central computing system 110 can determine the location of the first retail store by using the GPS location information of the hand-held electronic device 102c. The central computing system 110 can determine retail stores with availability of the first physical object within a predetermined distance of the first facility. In response to determining the unavailable product exists in a second facility within a predetermined distance of the first facility the central computing system 110 can request transportation of the unavailable product from the second facility to the first facility. The central computing system 110 can automatically dispatch a car or courier service such as Uber, Lyft, Get, to deliver the unavailable product from the second facility to the first facility.

In another embodiment, the central computing system 110 can prompt the user on a mobile device to pick potential substitute products at a time when the user is generating a list of products. For example, the central computing system 110 can provide a list of substitute products for one or more products included in the user's list. The user can choose to select substitute products from the list or can choose not to select substitute products from the list of substitute products. Selection of a substitute product by the user indicate that user's willingness to accept the substitute product in the event that the desired product is unavailable. For example, the user can order a 24 pack of Coca-Cola® which can be unavailable at the retail store. If the user selected a suitable substitute product for the 24 pack of Coca-Cola® at the time the user created the list of products, the substitute product—if available—can be used to replace the 24 pack of Coca-Cola®. In some embodiments, the central computing system can provide a list of substitute products similar to the 24 pack of Coca-Cola® as the user is generating the list of products based on dynamically learned matching behavior or a set of pre-established substitute products. For example, the central computing system 110 can learn user preferences and provide lists of substitute products to be select in case a requested product is unavailable. The user can choose to replace the 24 pack of Coca-Cola® with another product such as a 24 pack of Pepsi®. Otherwise the user can choose to remove the 24 pack of Coca-Cola® from the order. The central computing system 110 can save the user's selection in the user data source 130 for future orders.

In another embodiment, the central computing system 110 can provide the user with possible replacement products as the user is selecting the products for the order. For example, the user can select products for the order and the central computing system 1100 can query the physical objects data source and the users' data source to generate possible replacement products for at least one of the selected products. The central computing system 110 can receive the user's selection of at least one of the possible replacement products for the at least one selected product. The user can place the order. The central computing system can determine the at least one product is unavailable. The central computing system 110 can replace the at least one unavailable product with at least one replacement product provided by the user.

For example, while ordering a 24-pack of Coca-Cola® the central computing system can generate a list of a 2 liter bottle of Coca-Cola® and a 24-pack of Pepsi® as a possible replacement products in case the 24-pack of Coca-Cola® is unavailable. The user can select the 24-pack of Pepsi® as a possible replacement product. At the time the central computing system 110 is completing the order, the 24-pack of Coca-Cola® can be unavailable. The central computing system 110 can automatically replace the 24-pack of Coca-Cola® with the 24-pack of Pepsi® as selected by the user.

Figure 2:
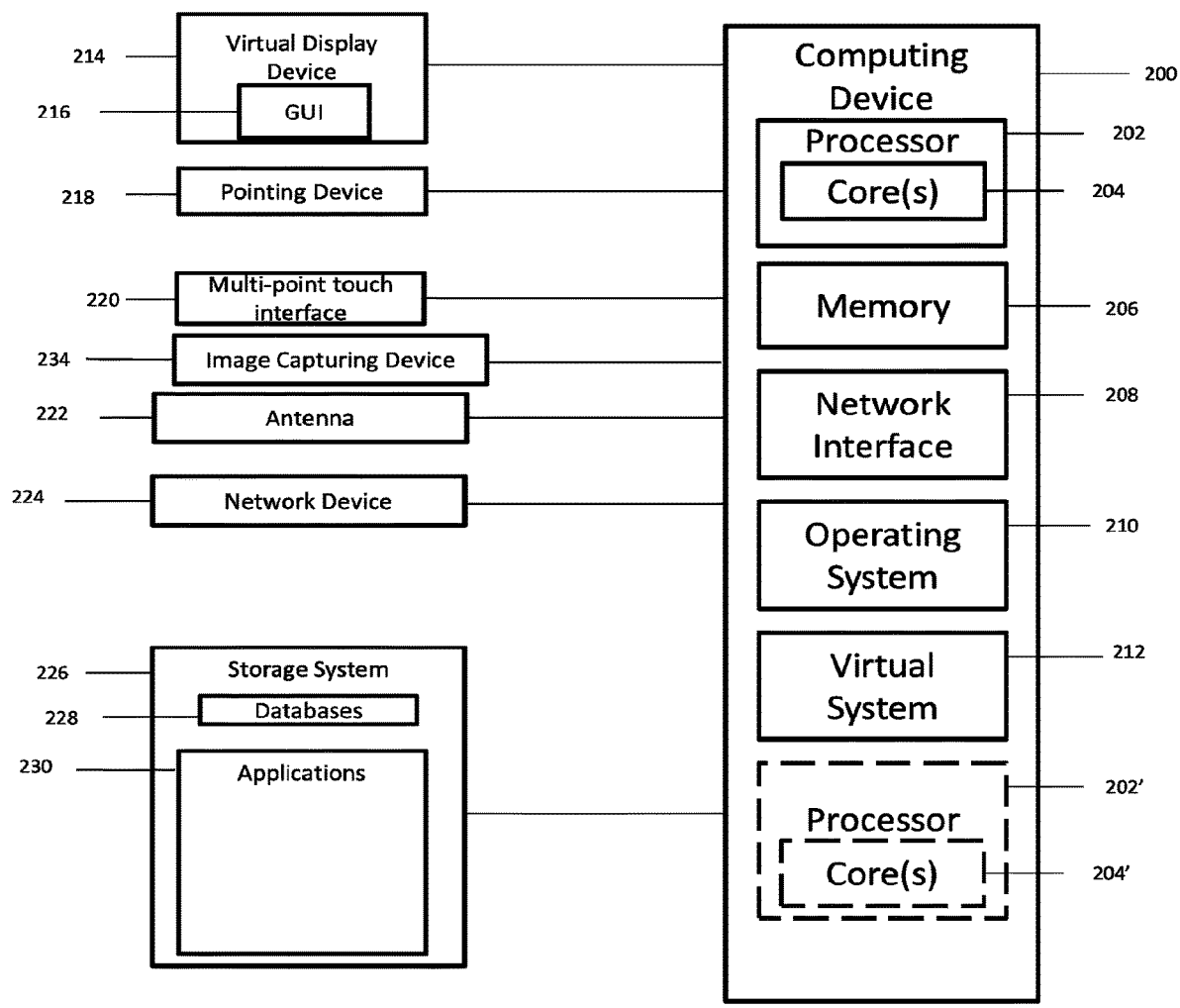
FIG. 2 is a block diagram of an example computing system for implementing exemplary embodiments of the present disclosure.

FIG. 2 is a block diagram of an example computing device for implementing exemplary embodiments of the present disclosure. In exemplary embodiments, the computing device 200 can implement embodiments of distributed computing system 110 or the hand-held electronic devices 102a-m. The computing device 200 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives, one or more solid state disks), and the like. For example, memory 206 included in the computing device 200 can store computer-readable and computer-executable instructions or software (e.g., applications 230) for implementing exemplary operations of the computing device 200. The computing device 200 also includes configurable and/or programmable processor 202 and associated core(s) 204, and optionally, one or more additional configurable and/or programmable processor(s) 202' and associated core(s) 204' (for example, in the case of computer systems having multiple processors/cores), for executing computer-readable and computer-executable instructions or software stored in the memory 206 and other programs for implementing exemplary embodiments of the present disclosure. Processor 202 and processor(s) 202' can each be a single core processor or multiple core (204 and 204') processor. Either or both of processor 202 and processor(s) 202' can be configured to execute one or more of the instructions described in connection with computing device 110.

Virtualization can be employed in the computing device 200 so that infrastructure and resources in the computing device 200 can be shared dynamically. A virtual machine 212 can be provided to handle a process running on multiple processors so that the process appears to be using only one computing resource rather than multiple computing resources. Multiple virtual machines can also be used with one processor.

Memory 206 can include a computer system memory or random access memory, such as DRAM, SRAM, EDO RAM, and the like. Memory 206 can include other types of memory as well, or combinations thereof.

A user can interact with the computing device 200 through a visual display device 214, such as a computer monitor, which can display one or more graphical user interfaces 216, multi touch interface 220 and a pointing device 218.

The computing device 200 can also include one or more storage devices 226, such as a hard-drive, CD-ROM, or other computer readable media, for storing data and computer-readable instructions and/or software that implement exemplary embodiments of the present disclosure (e.g., applications). For example, exemplary storage device 226 can include one or more databases 228 for storing information regarding the physical objects. The databases 228 can be updated manually or automatically at any suitable time to add, delete, and/or update one or more data items in the databases.

The computing device 200 can include a network interface 208 configured to interface via one or more network devices 224 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 222 to facilitate wireless communication (e.g., via the network interface) between the computing device 200 and a network and/or between the computing device 200 and other computing devices. The network interface 208 can include a built-in network adapter, network interface card, PCMCIA network card, card bus network adapter, wireless network adapter, USB network adapter, modem or any other device suitable for interfacing the computing device 200 to any type of network capable of communication and performing the operations described herein.

The computing device 200 can run any operating system 210, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 200 and performing the operations described herein. In exemplary embodiments, the operating system 210 can be run in native mode or emulated mode. In an exemplary embodiment, the operating system 210 can be run on one or more cloud machine instances.

Figure 3:
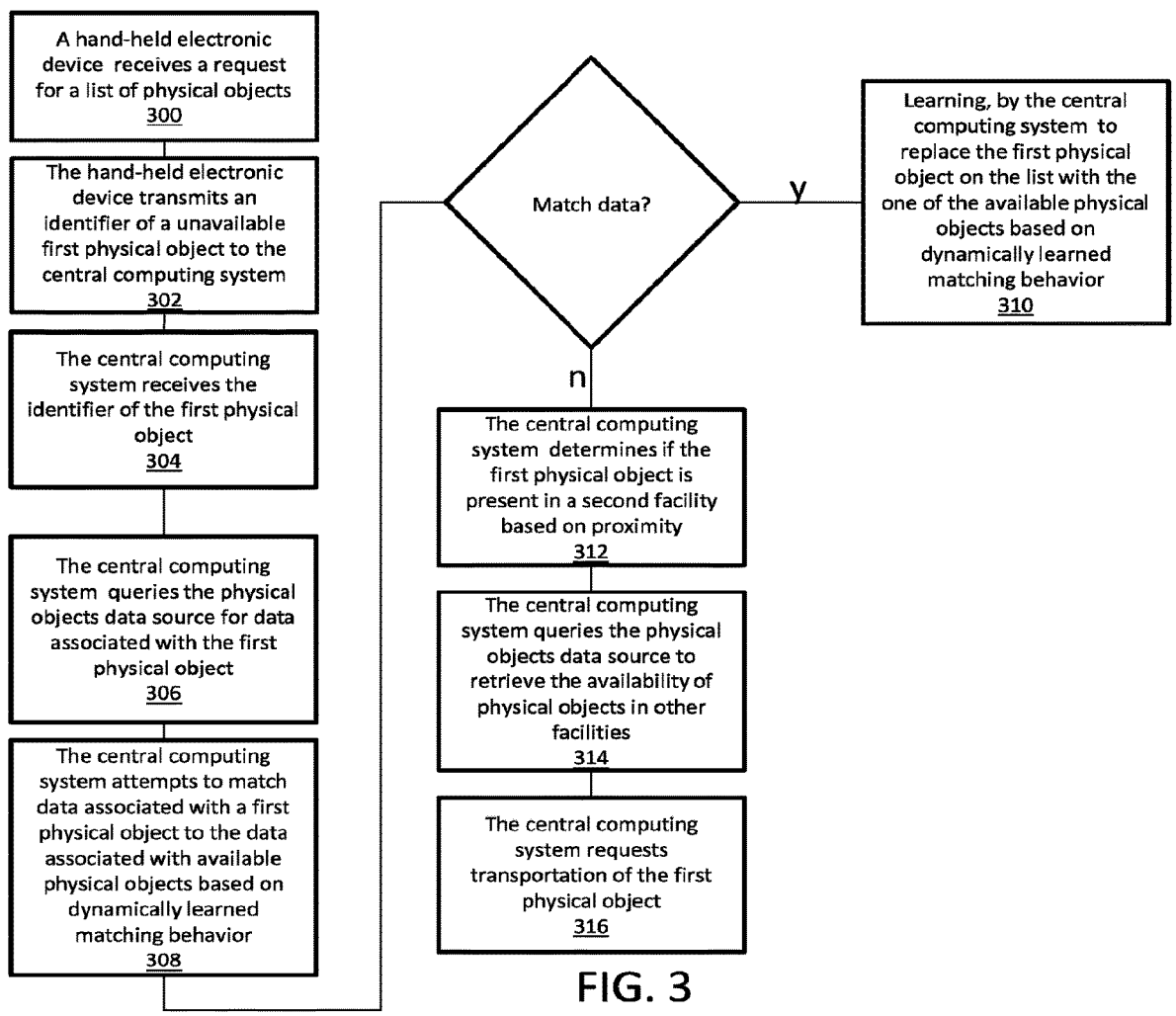
FIG. 3 is a flowchart illustrating an exemplary process for object matching and substitution in accordance with exemplary embodiments of the present disclosure.

FIG. 3 is a flowchart illustrating an exemplary process for object matching and substitution in accordance with exemplary embodiments of the present disclosure. In exemplary embodiments, in operation 300 a hand-held electronic device (e.g., hand-held electronic device 102c shown in FIG. 1) can receive a request for a list of physical objects. The hand-held electronic device can query a physical objects data source (e.g., the physical object data source 125) to process the request for physical objects. The hand-held electronic device can determine a first physical object of the requested physical objects is unavailable. In operation 302, the hand-held electronic device can transmit an identifier of a first physical object in the list of physical objects to the central computing system (e.g., central computing system 110 shown in FIG. 1) in response to determining that the first physical object is unavailable.

In operation 304, the central computing system can receive the identifier of the first physical object. In operation 306, the central computing system 110 can query the physical objects data source for data associated with the first physical object. The central computing system can retrieve, the name, type, size, weight, the quantity, the availability of the first physical object in other facilities and similar physical objects. The central computing system 110 can also retrieve data from the users data source (e.g., the users data source 130). In operation 308, based on the data retrieved from the physical objects data source and users data source, the central computing system can attempt to match data associated with a first physical object to the data associated with available physical objects based on dynamically learned matching behavior.

In operation 310, in response to matching data associated with one of the available physical objects to the data associated with the first physical object, learning, by the central computing system, to replace the first physical object on the list with the one of the available physical objects based on dynamically learned matching behavior.

In operation 312, in response to the inability to match the first physical object with an available physical objects in a first facility, the central computing system can determine if the first physical object is present in a second facility based on proximity. The central computing system can determine the location of the first facility by using the GPS location information of the hand-held electronic device. In operation 314, the central computing system can query the physical objects data source to retrieve the availability of physical objects in other facilities. The central computing system can determine facilities with availability of the first physical object within a predetermined distance of the first facility. In operation 316, in response to determining the first physical object exists in a second facility within a predetermined distance of the first facility the central computing system can request transportation of the first physical object from the second facility to the first facility. The central computing system can automatically dispatch a car or courier service such as Uber, Lyft, Get, to deliver the physical object from the second facility to the first facility.

Figure 4:
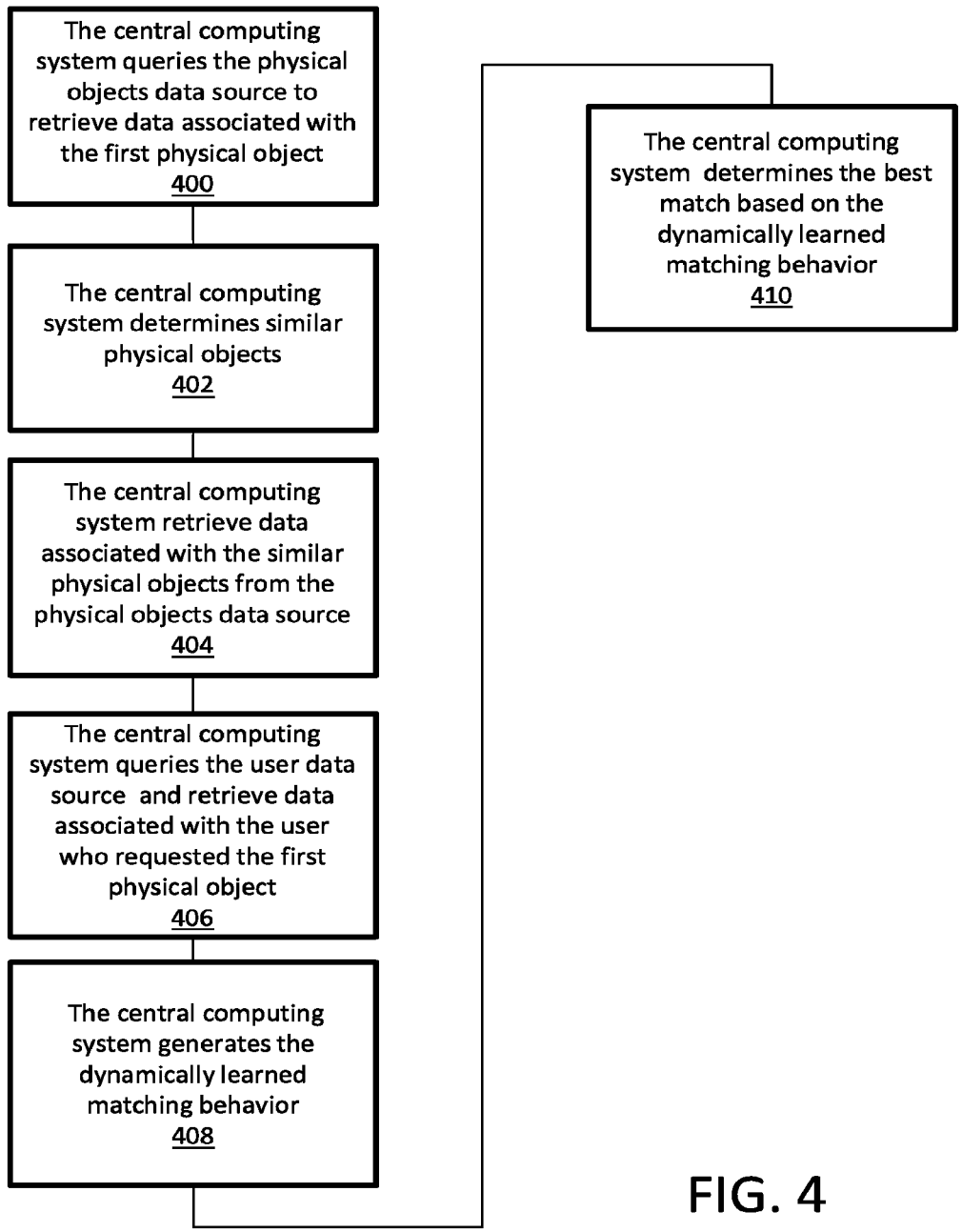
FIG. 4 is a flowchart illustrating an exemplary process dynamic learning in accordance with exemplary embodiments of the present disclosure.

FIG. 4 is a flowchart illustrating an exemplary process for dynamic machine learning in accordance with exemplary embodiments of the present disclosure. The flowchart in FIG. 4 illustrates a central computing system (e.g., the central computing system 110) dynamically learning the best possible match for the first physical object (e.g., the substitute physical object most likely to be accepted by a user). In exemplary embodiments in operation 400, the central computing system can query a physical objects data source (e.g., the physical objects data source 125) to retrieve data associated with the first physical object. The central computing system can retrieve, the name, type, size, weight, the quantity, the availability of the first physical object in other facilities and similar physically objects. In operation 402, the central computing system can determine similar physical objects based on type, name, size, and weight or the similar physical objects stored in the physical objects data source. In operation 404, the central computing system can retrieve data associated with the similar physical objects from the physical objects data source. In operation 406, the central computing system can query a users' data source (e.g. the users data source 130) and retrieve data associated with the user who requested the first physical object. The central computing system can also query the user data source to retrieve the data associated with all the users who have requested the first physical object in the past and the first physical object has been unavailable. The users data source can contain user name, address, and account history. The account history can include past requests of the first physical object.

In operation 408, the central computing system the central computing system can generate the dynamically learned matching behavior based on a collective response of a group of users to past object substitutions and similarities between the data associated with the first physical object and the data associated with the available physical objects.

In operation 410, the central computing system can determine the best match based on the dynamically learned matching behavior.

Figure 5:
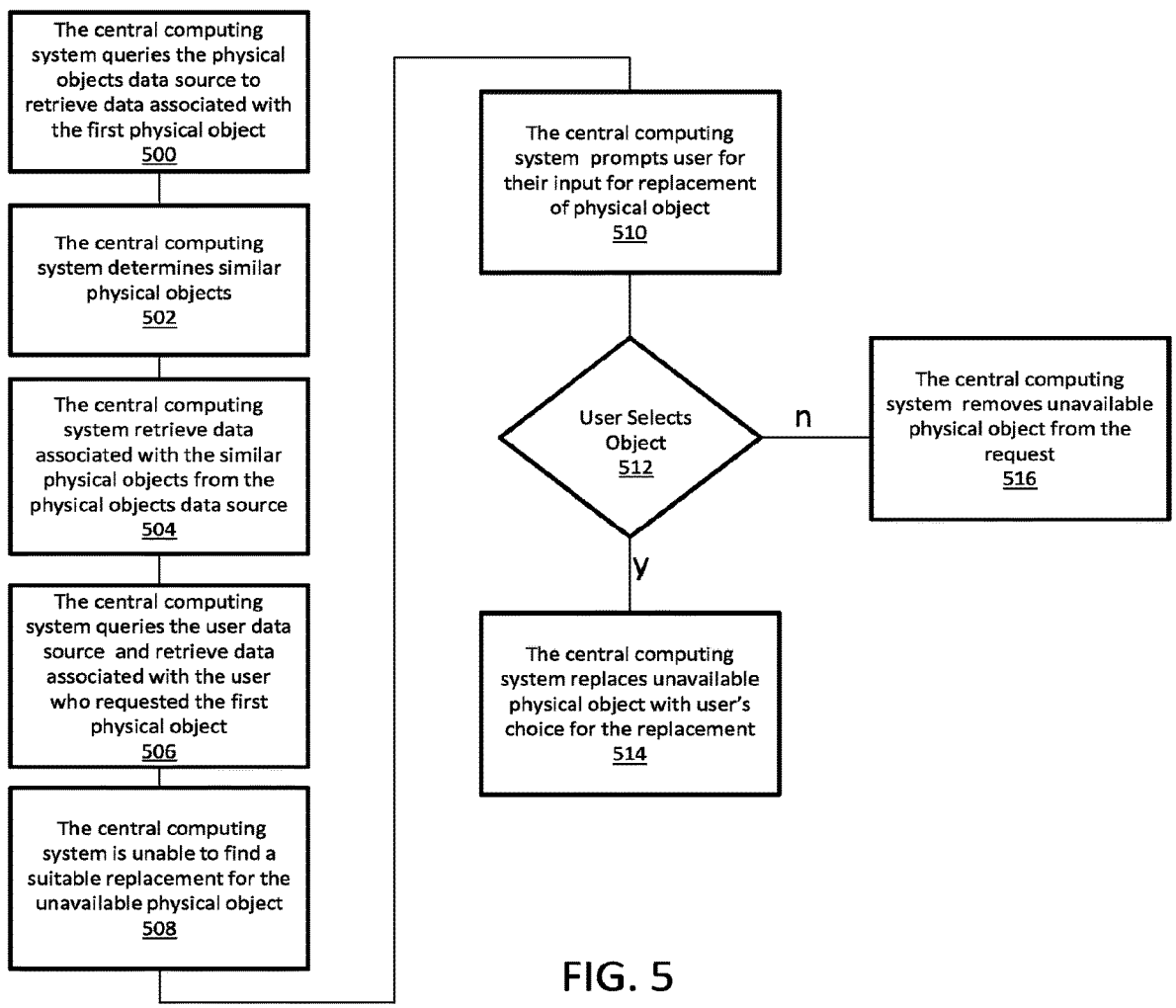
FIG. 5 is a flowchart illustrating an exemplary prompting the user to select a replacement physical object in accordance with exemplary embodiments of the present disclosure.

FIG. 5 is a flowchart illustrating an exemplary process for the user selecting the replacement physical object from a list of similar physical object exemplary embodiments of the present disclosure. In exemplary embodiments in operation 500, the central computing system can query a physical objects data source (e.g., the physical objects data source 125) to retrieve data associated with the first physical object. In operation 502, the central computing system can determine similar physical objects based on type, name, size, and weight or the similar physical objects stored in the physical objects data source. In operation 504, the central computing system can retrieve data associated with the similar physical objects from the physical objects data source. In operation 506, the central computing system can query a user's data source (e.g. the users data source 130) and retrieve data associated with the user who requested the first physical object. The central computing system can also query the user data source to retrieve the data associated with all the users who have requested the first physical object in the past and the first physical object has been unavailable.

In operation 508, the central computing may be unable to find a suitable replacement based on the data collected from the physical objects data source and the user's data source. In some embodiments, central computing system cannot find a suitable replacement physical object due to the lack of data available in the user's account history. For example, the user who has requested the unavailable physical objects may be a first time user. The physical object requested may be a brand new product. In other embodiments, the central computing system cannot find a suitable replacement physical object because the central computing system has dynamically learned that the user who has requested the unavailable physical object prefers selecting a replacement physical object in times a physical object is unavailable.

In operation 510, the central computing system can prompt the user to select a replacement physical object out of a list of similar physical objects. The central computing system can prompt the user on the user's device such as: wireless devices, portable devices, wearable computers, cellular or mobile phones, portable digital assistants (PDAs), smart phones, tablets, ultrabooks, netbooks, laptops, multi-processor systems, microprocessor-based or programmable consumer electronics, mini-computers, and the like.

In operation 512, the user can choose a replacement physical object from the list of similar physical objects. In response to selecting a replacement physical object, in operation 514, the central computing system can replace the unavailable physical object with the replacement physical object. In response to not selecting a replacement physical object, in operation 516, the central computing system can remove the unavailable physical object from the request of physical objects. The central computing system can store the decision of the user in the database.

Figure 6:
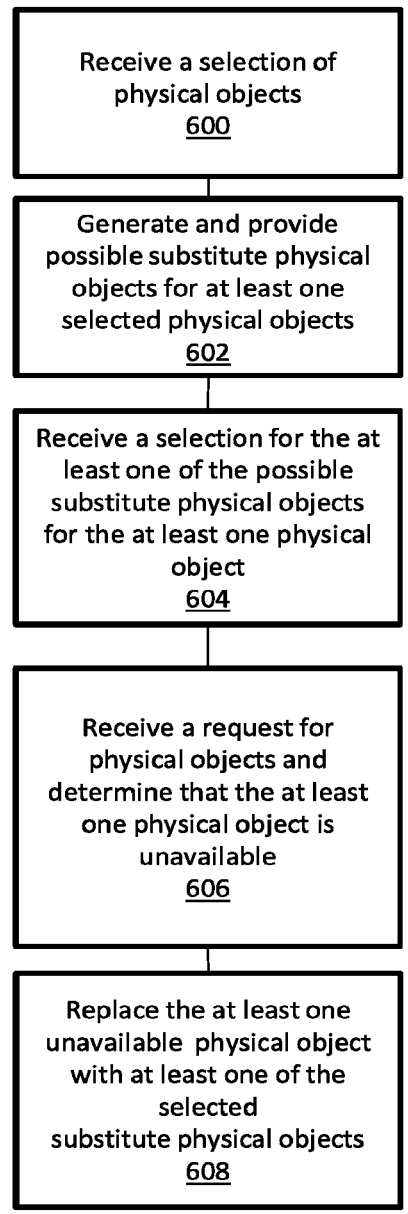
FIG. 6 is a flowchart illustrating an exemplary prompting the user to select a replacement physical object before sending the request in accordance with exemplary embodiments of the present disclosure.

FIG. 6 is a flowchart illustrating an exemplary process for determining and receiving possible substitute physical objects before requesting the physical objects according to exemplary embodiments of the present disclosure. In operation 600, the central computing system may receive a selection of at least one physical object to be added to a list of physical objects in response to input from a user during a first time period. In operation 602, the central computing system may query the physical objects data source and the user's data source to generate and provide a list of possible substitute physical objects for the at least one physical object should the physical object become unavailable during a second time period. The central computing system can generate a list of similar physical objects based on the similarity of the data stored in the physical objects data source, such as type or brand of the physical object to the data of the list of similar physical objects. In another embodiment, a list of similar physical objects may be stored as a data entry associated with the physical object. The central system can also use the data retrieved form the physical objects data source and the users' data source to dynamically learn similar physical objects to the unavailable.

In operation 604, the central computing system may receive at least one selection from the list of possible substitute physical objects for the at least one physical object. In operation 606, the central computing system or the handheld electronic device may receive a request including a request for a list of physical objects generated by the user during a second time period. The central computing system and/or the handheld electronic device may determine the at least one physical object in the list of physical objects is unavailable.

In operation 608, the central computing system and/or the handheld electronic device can replace the at least one unavailable physical object with the at least one substitute physical object for the at least one unavailable physical object.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A dynamic system for object matching and substitution, the system comprising:
    a central computing system comprising at least one processor in communication over a distributed network with an application executed on each of a plurality of hand-held electronic devices;
    wherein the central computing system is programmed to: (i) receive, from the application executed on a first hand-held electronic device of the plurality of hand-held electronic devices, an identifier of a first physical object in a list of physical objects in response to the first physical object being unavailable; (ii) query a database for data associated with the first physical object; (iii) attempt to match at least some of the data associated with the first physical object to data associated with available physical objects based on dynamically learned matching behavior; and (iv) in response to matching data associated with one of the available physical objects to the data associated with the first physical object, learning to replace the first physical object on the list of physical objects with the one of the available physical objects based on dynamically learned matching behavior,
    wherein the central computing system generates the dynamically learned matching behavior based on a collective response of a plurality of users to past object substitutions and similarities between the data associated with the first physical object and the data associated with the available physical objects; and
    wherein the central computing system is configured to cause the application executed on the first hand-held electronic devices to replace, within the list of physical objects, the identifier of the first physical object with an identifier of the one of the available physical objects based on the learning to replace the first physical object on the list of physical objects with the one of the available physical objects; and
    wherein the central computing system is further programmed to: (i) receive, from the application executed on a second hand-held electronic device of the plurality of hand-held electronic devices, a second list of physical objects comprising an identifier of a second physical object; (ii) identify that the second physical object is unavailable; (iii) query the database for data associated with the second physical object; (iv) attempt to match at least some of the data associated with the second physical object to data associated with available physical objects based on dynamically learned matching behavior, (v) prevent replacing within the second list of physical objects the second physical object based on dynamically learned behavior that a second user associated with the second hand-held electronic device prefers to select a replacement physical object when a requested physical object is unavailable; and (v) prompt the second user to select a replacement physical object out of a list of replacement similar physical objects.

2. The system in claim 1, wherein in response to an inability to match the first physical object with one of the available physical objects in a first facility, the central computing system is further programmed to determine when the first physical object is present in a second facility based on proximity.

3. The system in claim 1, wherein in response to an inability to match the first physical object with one of the available physical objects in a first facility, the central computing system is further programmed to implement delivery of the first physical object.

4. The system in claim 1, wherein in response to an inability to match the first physical object with one of the available physical objects in a first facility, the central computing system is further programmed to identify when the first physical object is present in a second facility and automatically control delivery of the first physical object from the second facility.

5. The system in claim 1, wherein the central computing system in dynamically learned matching behavior is configured to apply a decision tree learning as a predictive model mapping observations about previous decisions over time regarding replacing of the identifier of the first physical object within multiple different lists of physical objects and consequences of the previous decisions associated with the first physical object.

6. The system in claim 5, wherein the central computing system in dynamically learned matching behavior is configured to apply association rule learning in discovering relationships between data sources each corresponding to one of the physical objects, cluster analysis, and Bayesian network learning.

7. The system of claim 1, wherein the central computing system is further configured to query a users data source to retrieve data associated with multiple users having requested the first physical object in the past and the first physical object having been unavailable, and find the one of the available physical objects as a suitable replacement of the first physical object based on the data associated with the available physical objects and the data associated with the multiple users from the users data source.

8. A method implemented by dynamic learning system for object matching and substitution, the method comprising:
receiving, via an application executed on a hand-held electronic device and over a distributed network, an identifier of a first physical object in a list of physical objects at a central computing system in response to determining that the first physical object is unavailable;
querying, via the central computing system, a database for data associated with the first physical object;
attempting, via the central computing system, to match at least some of the data associated with the first physical object to data associated with available physical objects based on dynamically learned matching behavior;
in response to matching data associated with one of the available physical objects to the data associated with the first physical object, learning, by the central computing system, to replace the first physical object on the list of physical objects with the one of the available physical objects based on dynamically learned matching behavior,
generating the dynamically learned matching behavior based on a collective response of a plurality of users to past object substitutions and similarities between the data associated with the first physical object and the data associated with the available physical objects;
causing, via the central computing system, the application executed on the hand-held electronic device to replace, within the list of physical objects, the identifier of the first physical object with an identifier of the one of the available physical objects based on the learning to replace the first physical object on the list of physical objects with the one of the available physical objects,
receiving, from the application executed on a second hand-held electronic device of a plurality of hand-held electronic devices, a second list of physical objects comprising an identifier of a second physical object;
identifying that the second physical object is unavailable;
querying the database for data associated with the second physical object;
attempting to match at least some of the data associated with the second physical object to data associated with available physical objects based on dynamically learned matching behavior;
preventing replacing within the second list of physical objects the second physical object based on dynamically learned behavior that a second user associated with the second hand-held electronic device prefers to select a replacement physical object when a requested physical object is unavailable; and
prompting the second user to select a replacement physical object out of a list of replacement similar physical objects.

9. The method in claim 8, further comprising determining, in response to an inability to match the first physical object with one of the available physical objects in a first facility, when the first physical object is present in a second facility based on proximity.

10. The method in claim 8, further comprising in response to an inability to match the first physical object with one of the available physical objects in a first facility, implementing delivery of the first physical object.

11. The method of claim 8, further comprising:
identifying, in response to an inability to match the first physical object with one of the available physical objects in a first facility, when the first physical object is present in a second facility; and
automatically controlling delivery of the first physical object from the second facility.

12. The method of claim 8, wherein the dynamically learning matching behavior comprises applying a decision tree learning as a predictive model mapping observations about previous decisions over time regarding replacing of the identifier of the first physical object within multiple different lists of physical objects and consequences of the previous decisions associated with the first physical object.

13. The method of claim 12, wherein the dynamically learning the matching behavior comprises applying association rule learning in discovering relationships between data sources each corresponding to one of the physical objects, cluster analysis, and Bayesian network learning.

14. The method claim 8, further comprising:
querying a users data source to retrieve data associated with multiple users having requested the first physical object in the past and the first physical object having been unavailable, and finding the one of the available physical objects as a suitable replacement of the first physical object based on the data associated with the available physical objects and the data associated with the multiple users from the users data source.

15. A non-transitory computer readable memory storing instructions, wherein the instructions are executable by at least one processor to:
receive, via an application executed on a hand-held electronic device and over a distributed network, an identifier of a first physical object in a list of physical objects at a central computing system in response to determining that the first physical object is unavailable;
query, via the central computing system, a database for data associated with the first physical object;
attempt, via the central computing system, to match at least some of the data associated with the first physical object to data associated with available physical objects based on dynamically learned matching behavior;
in response to matching the data associated with one of the available physical objects to the data associated with the first physical object, learning, by the central computing system, to replace the first physical object on the list of physical objects with the one of the available physical objects based on dynamically learned matching behavior,
generate the dynamically learned matching behavior based on a collective response of a plurality of users to past object substitutions and similarities between the data associated with the first physical object and the data associated with the available physical objects;
cause, via the central computing system, the application executed on the hand-held electronic device to replace, within the list of physical objects, the identifier of the first physical object with an identifier of the one of the available physical objects based on the learning to replace the first physical object on the list of physical objects with the one of the available physical objects;
receive, from the application executed on a second hand-held electronic device of a plurality of hand-held electronic devices, a second list of physical objects comprising an identifier of a second physical object;
identify that the second physical object is unavailable;
query the database for data associated with the second physical object;
attempt to match at least some of the data associated with the second physical object to data associated with available physical objects based on dynamically learned matching behavior;
prevent replacing within the second list of physical objects the second physical object based on dynamically learned behavior that a second user associated with the second hand-held electronic device prefers to select a replacement physical object when a requested physical object is unavailable; and
prompt the second user to select a replacement physical object out of a list of replacement similar physical objects.

* * * * *

UNITED STATES PATENT AND TRADEMARK OFFICE
CERTIFICATE OF CORRECTION

| | |
|---|---|
| PATENT NO. | : 11,741,395 B2 |
| APPLICATION NO. | : 17/850302 |
| DATED | : August 29, 2023 |
| INVENTOR(S) | : High et al. |

It is certified that error appears in the above-identified patent and that said Letters Patent is hereby corrected as shown below:

In the Claims

In Column 14, Claim 14, Line 61, delete "method claim" and insert -- method of claim --.

Signed and Sealed this
Twenty-third Day of April, 2024

Katherine Kelly Vidal
*Director of the United States Patent and Trademark Office*